Dec. 15, 1953 D. L. BEASLEY 2,662,362
ADJUSTABLY MOUNTED PLATFORM FOR WINDROWERS
Filed Feb. 18, 1950 4 Sheets-Sheet 2
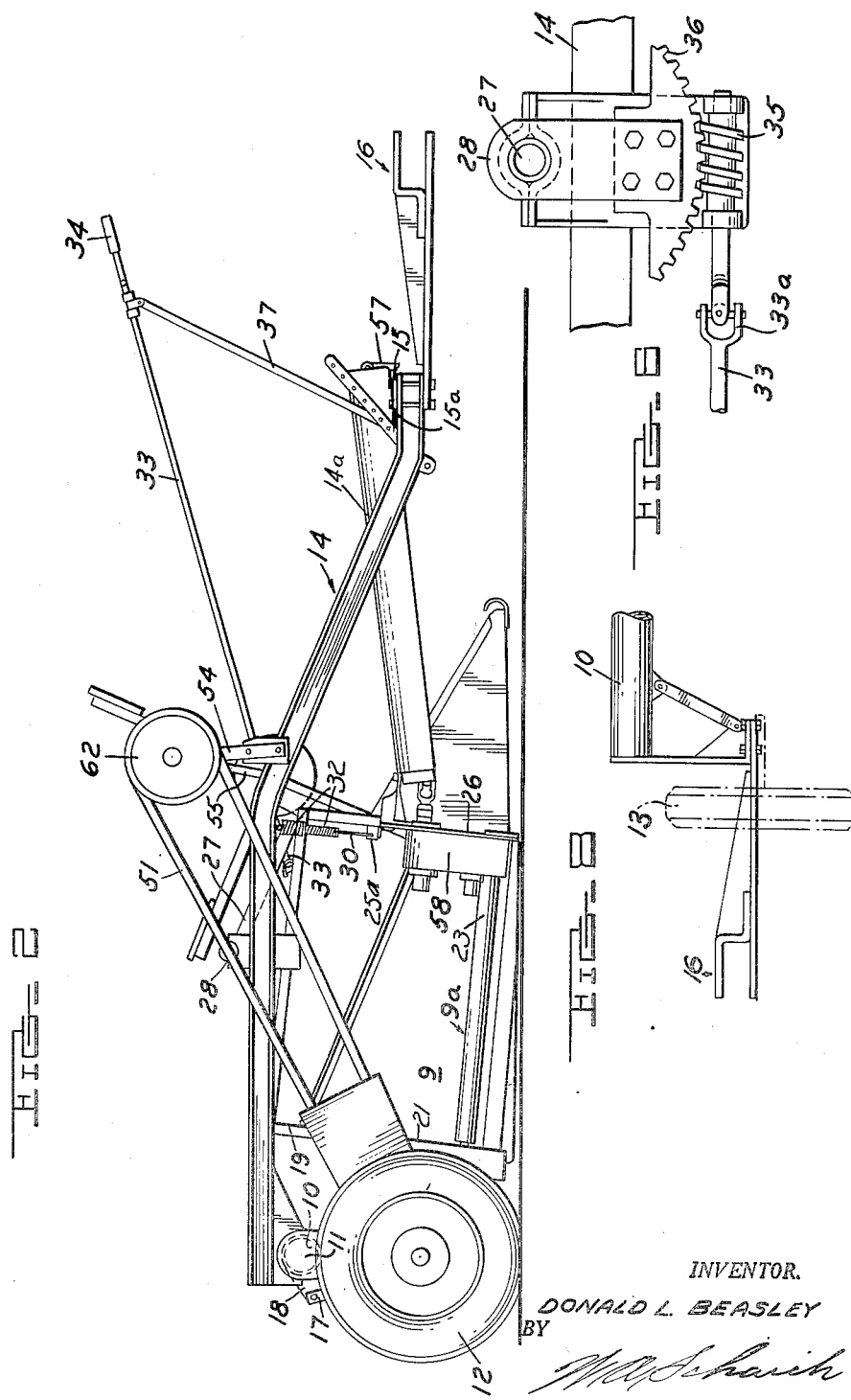
INVENTOR.
DONALD L. BEASLEY
BY
ATTORNEY Dec. 15, 1953   D. L. BEASLEY   2,662,362
ADJUSTABLY MOUNTED PLATFORM FOR WINDROWERS
Filed Feb. 18, 1950   4 Sheets-Sheet 3
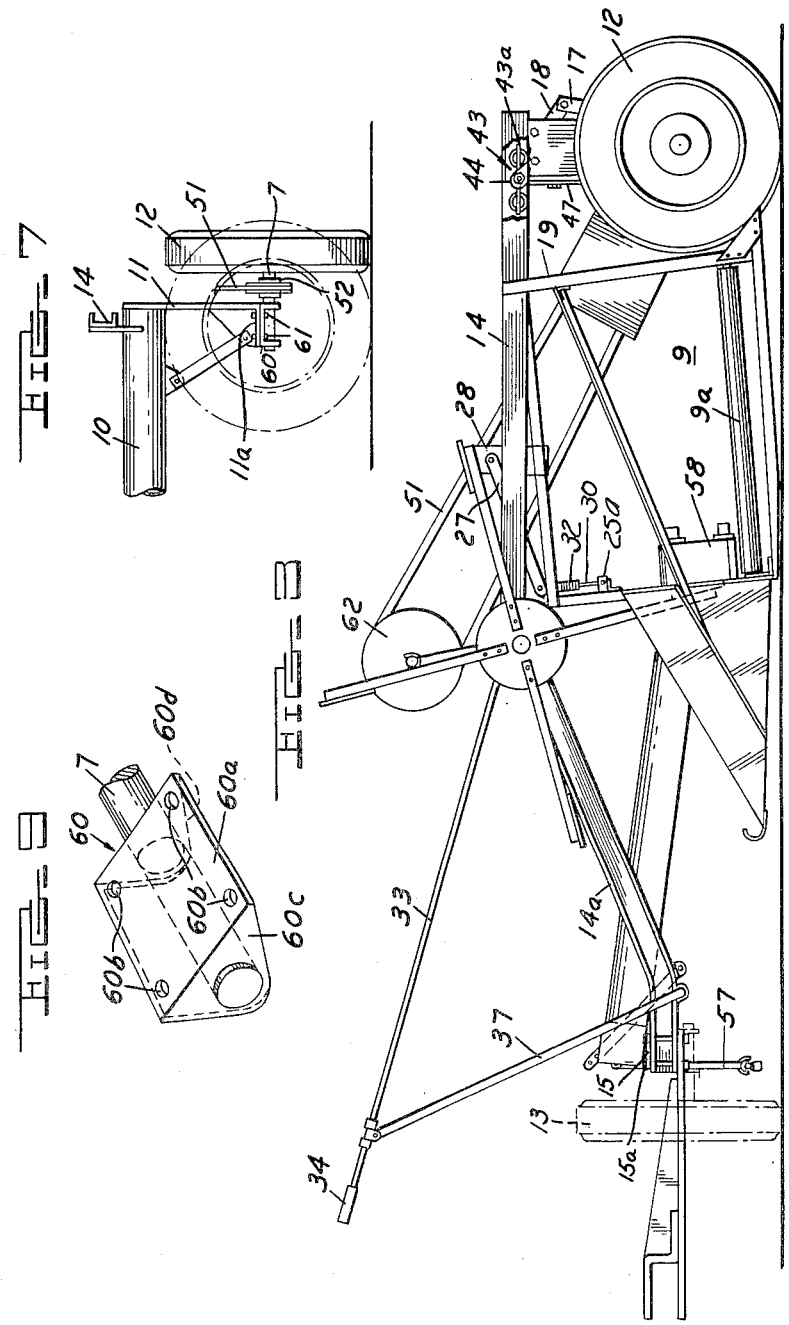
INVENTOR.
DONALD L. BEASLEY
BY
ATTORNEY

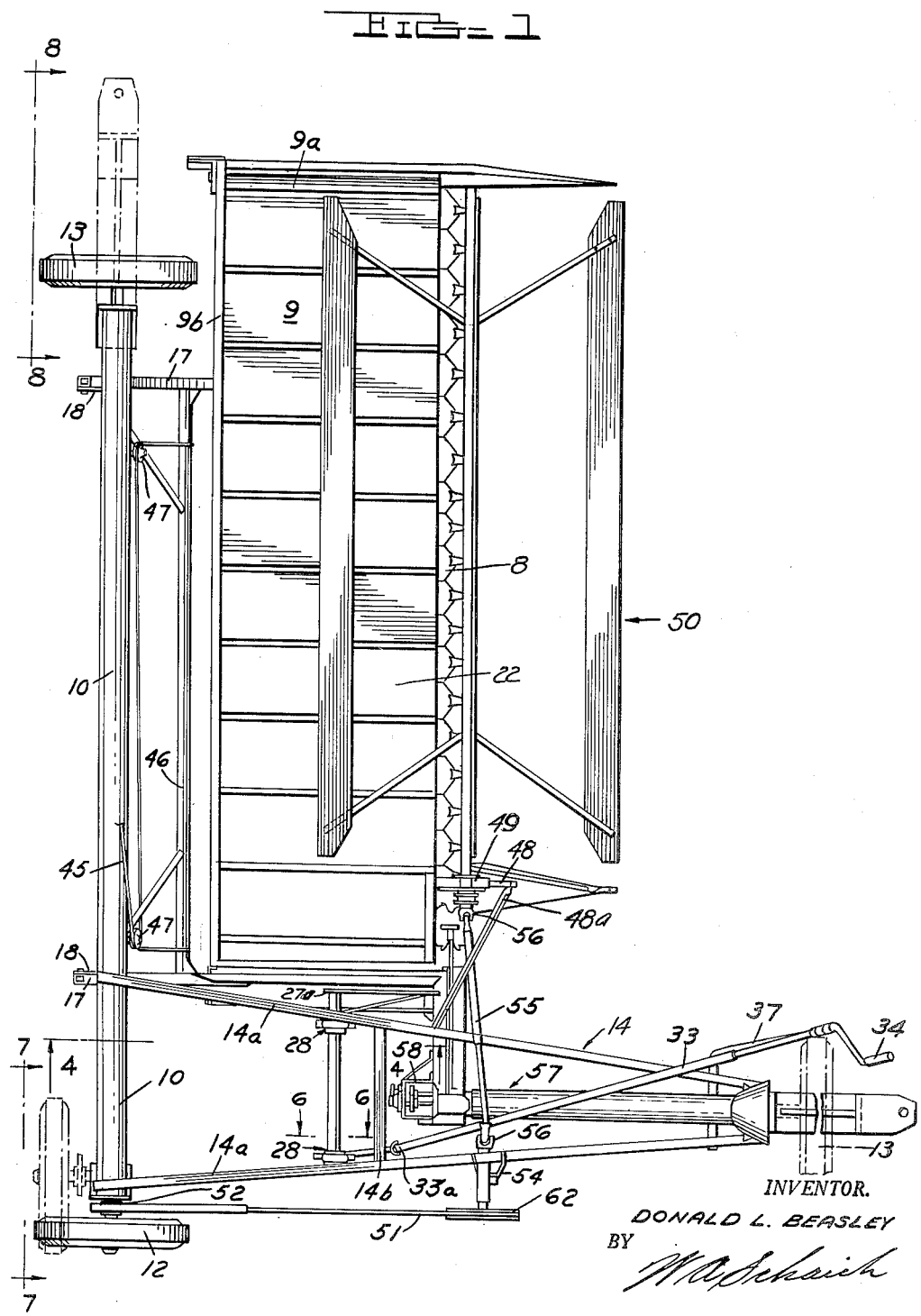

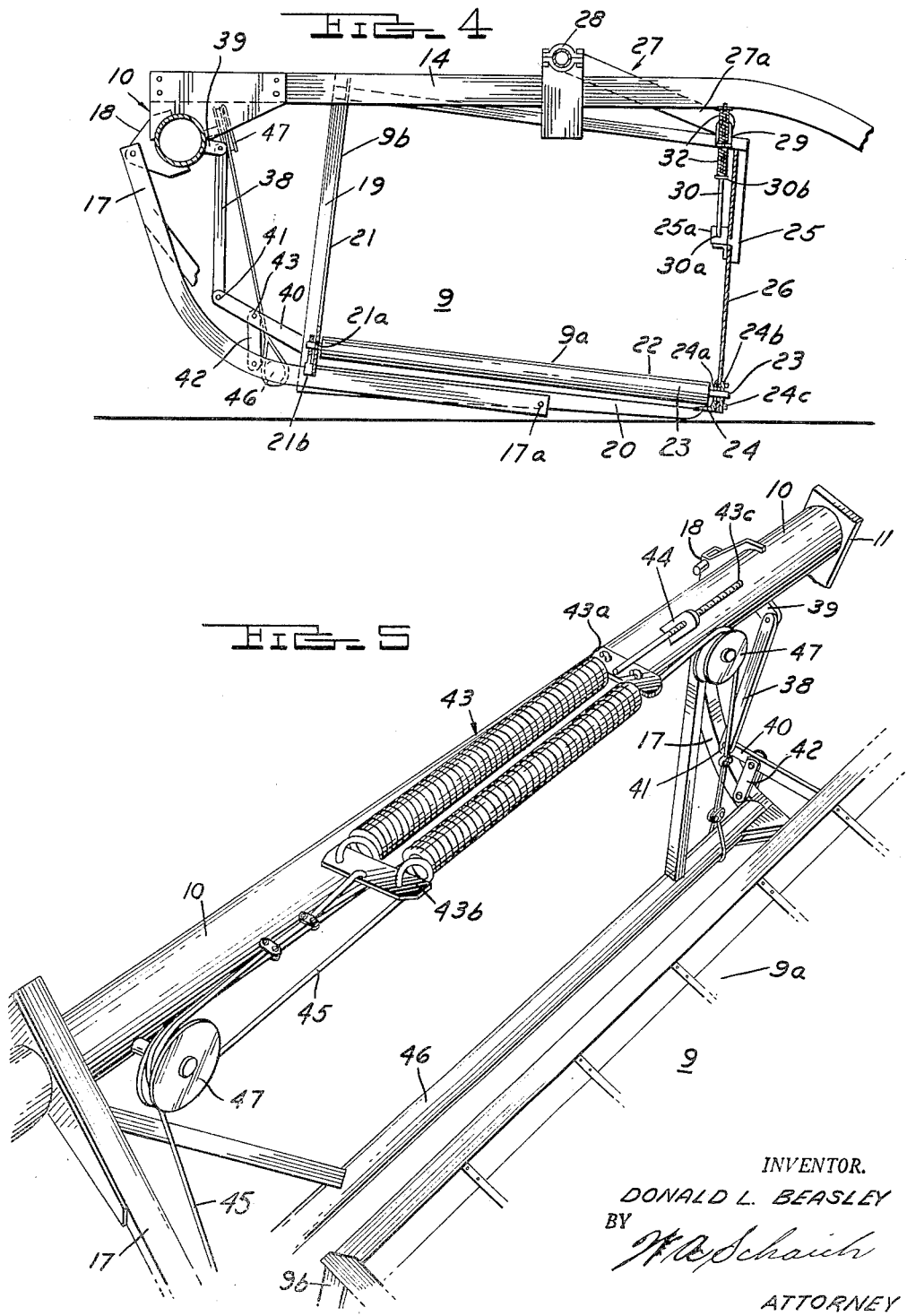

Patented Dec. 15, 1953

2,662,362

UNITED STATES PATENT OFFICE 2,662,362

ADJUSTABLY MOUNTED PLATFORM FOR WINDROWERS

Donald L. Beasley, Des Moines, Iowa, assignor to Wood Bros. Inc., Des Moines, Iowa, a corporation of Iowa Application February 18, 1950, Serial No. 144,941

2 Claims. (Cl. 56—208)

This invention relates to an improved construction of a harvester type of farm implement more commonly referred to as a windrower or swather.

The function of implements of this general type is to cut a relatively wide swath of grain, hay or similar vegetation crops and convey the cut crop laterally to deposit such on the ground in a windrow. Obviously, the capacity of this type of harvester is a direct function of the over-all length of the cutting bar and it is therefore desirable to employ cutting bars having lengths in excess of ten feet. This inherently results in an over-all construction for the harvester being of substantially greater dimension in a direction transverse to its line of travel, when operated in the field, than its longitudinal dimension. Accordingly, implements of this type offer considerable difficulty in transport along roads in going to and from the field or in passing through gates.

Another common requirement of harvesters of this general type is that some degree of vertical adjustability of the header be provided to permit cutting of the crop at a desired height. The most economical type of construction for an adjustable height header is one which employs a pivotal mounting of the header upon a main transversely extending frame member. However, any such pivotal mounting would result in an undesirable tilting of the cutter bar and the conveying canvas at either of the two extreme vertical positions, so it has been customary to provide some form of mechanism for automatically maintaining a desired tilt of the cutter bar and conveyor irrespective of the vertical position of the entire header.

Accordingly, it is an object of this invention to provide an improved harvesting type of farm implement characterized by an unusually economically manufacturable, yet rugged frame construction.

A further object of this invention is to provide a selective mounting arrangement for the wheels of a harvester type farm implement to permit such implement to be transported with its longer dimension aligned with the direction of travel.

Still another object of this invention is the provision of an improved automatic leveling mechanism for the header of a windrower or similar harvesting implement.

The specific nature of this invention, as well as other objects and advantages thereof, will become apparent to those skilled in the art from the following detailed description, taken in conjunction with the attached sheets of drawings on which, by way of preferred example only is illustrated one embodiment of this invention.

On the drawings:

Figure 1 is a plan view of a harvesting unit constructed in accordance with this invention, with the alternate wheel and tongue positions for transport purposes indicated in dot-dash lines.

Figure 2 is a left side elevational view of the harvester in Figure 1.

Figure 3 is a right side elevational view of the harvester in Figure 1, with the alternate transport position of the wheel being indicated in dotted lines.

Figure 4 is a partial sectional view taken on the plane 4—4 of Figure 1 and on an enlarged scale.

Figure 5 is an enlarged perspective view of the spring suspension mechanism for the header.

Figure 6 is an enlarged scale, partial sectional view taken on the plane 6—6 of Figure 1.

Figure 7 is a partial sectional view taken along the plane 7—7 of Figure 1, and illustrating the alternate transport position of the wheel in dotted line.

Figure 8 is a partial sectional view taken along the plane 8—8 of Figure 1.

Figure 9 is an enlarged perspective view of the axle mounting unit for the transport wheels.

As shown on the drawings:

The harvester embodying this invention is constructed on a main transverse tubular frame element 10 having depending brackets 11 at each end thereof to respectively mount a pair of transport wheels 12 and 13. On one end of the main transverse frame 10, a forwardly projecting draft frame structure 14 is rigidly mounted, being formed of welded channel iron elements 14a and cross braces 14b. The forward end portions of draft frame channels 14a are bent downwardly and welded to a connecting plate 15. During the operation of the harvester, a draft tongue or hitch member 16 of any suitable type is detachably secured to plate 15 by bolts and permits the harvester to be pulled by a suitable tractor.

A plurality of angularly or arcuately shaped support arms 17 are pivotally mounted in depending relation to spaced points along the main frame 10. Mounting brackets 18 are welded to main frame 10 to provide the pivotal mounting for the support arms 17.

A generally angularly shaped header 9 is provided comprising a horizontal bed portion 9a and a rear vertical wall portion 9b. The vertical wall portion is defined by an angle iron frame structure including upright angle members 19 and a sheet metal wall 21. The horizontal bed portion 9a of the header is defined by an angle iron frame structure including a transversely extending front angle member 24 and longitudinally extending end angle members 20. The header 9 is supported on support arms 17 by virtue of pivoted connections of the bottom ends of support arms 17 to the medial portions of the frame angles 20, as by pins 17a.

A cutter bar 8 is mounted in conventional fashion along the front edge of the bed portion 9a of the header 9 and a horizontally extending belt or draper conveyor 22 is mounted along such bed portion, having its front edge immediately rearwardly of the cutter bar 8 and being trained over suitable rollers 23. The ends of the inner roller 23 are respectively journaled in rear wall 21 and the horizontal frame angle 24. The outer roller 23, Figure 4, is longitudinally adjustable for tensioning of the draper. One end of such outer roller passes through a longitudinal transverse slot 24a in frame angle 24 and is journaled in a bearing plate 24b secured by bolts 24c for longitudinal slidable adjustment. The other end of inner roller 23 likewise passes through a slotted hole 21a in rear plate 21 and such end is journaled in a bracket 21b secured to the wall 21 by bolts (not shown). Hence, all vegetation cut by the cutter bar 8 falls to the draper conveyor 22 and is carried transversely to one end of the header 9 for deposit on the ground in a windrow. In this instance, the draper conveyor 22 is moved in such a direction as to deposit the cut vegetation on the end of the header 9 which is adjacent to the draft frame 14.

The draper conveyor 22 extends a substantial distance past the end of the cutter bar 24 towards the draft frame 14 and an upstanding frame structure 25 supports a vertical wall 26 in front of this laterally projecting portion of the draper conveyor 22. A crank 27 is journaled in bearings 28 across the top of the draft frame elements 14a. Crank 27 has a crank arm portion 27a overlying the adjacent end of the header 9 and this arm is resiliently connected to the upstanding frame structure 25 so that the angular position of crank 27 determines the height of the header 9. The resilient connection of crank arm 27a to upstanding frame structure 25 may conveniently comprise an angle bracket 29 rigidly secured to the free end of the crank arm 27 and apertured to receive a connecting rod 30 which has a bent end 30a engaged in a suitable apertured bracket 25a welded to upstanding frame structure 25. Transverse stop pins 30b are inserted in connecting rod 30 on opposite sides of the position of the bracket 29 and compression springs 32 are mounted respectively between the stop pins 30b and the opposite sides of bracket 29. Hence, in all positions of vertical adjustment, the header 9 is floatingly supported by the springs 32.

The angular position of the crank 27 may be conveniently adjusted from the operator's seat on the tractor by means of an elongated shaft 33 having a crank 34 secured to its forward end and a universal joint 33a secured to its rear end and coupled to a worm 35 which cooperates with a sector gear 36 secured to crank 27. The forward end of adjusting shaft 33 is supported in an elevated position, convenient for grasping by the tractor operator, by a rod-like support 37 which has its bottom end pivotally mounted to one of the draft frame elements 14a.

As the header 9 is elevated by the mechanism heretofore described, it is desirable that the cutter bar 8 and the draper conveyor 22 maintain approximately the same angle of inclination with respect to the ground surface in all of the vertical positions of the header. In accordance with this invention, a leveling linkage for the header is provided which comprises essentially three interconnected links. Preferably, a set of such three links is provided in cooperation with each one of the support arms 17. Referring particularly to Figure 4, the leveling linkage comprises a first link 38 having its one end pivotally connected to a mounting bracket 39 secured to main frame 10, a second link 40 having one end pivotally secured to a vertical frame angle 19 of the header 9 and a third link 42 having its one end pivotally secured to a medial portion of the support arm 17. The other ends of levers 38 and 40 are pivotally interconnected as indicated at 41, while the other end of third link 42 is pivotally connected to a medial portion of second link 40 as indicated at 43. With the described linkage, it is apparent that as the header 9 is raised, it is proportionally tilted in a clockwise direction about the pivot defined by the pins 17a so as to maintain substantially the same angle of inclination of the bed portion 9a of such header throughout its range of vertical adjustment.

As is well known, it is desirable that most of the weight of the header 9 be counterbalanced so that when the header 9 rests on the ground it is urged downwardly only with sufficient force to insure that it will follow the variations of the ground contour. Also, the counterbalancing of the header 9 promotes the ease of manual adjustment of its vertical position. In accordance with this invention, a counterbalancing arrangement is provided comprising a tension spring device 43 having its one end 43a adjustably secured to a fixed bracket 44 on main frame 10 as by a threaded rod 43c and its other end 43b connected in counterbalancing relationship to the header 9 as by a pair of cables 45 respectively connnected to opposite ends of a transverse bar 46 connecting the supporting arm 17, the cables 45 being trained over pulleys 47 journaled at spaced points on main frame 10.

A reel post 48 is mounted on the inner end of the upstanding frame structure 25 of header 9 in a vertical, forwardly inclined relationship and is braced by rod 48a. A reel bearing 49 is slidably mounted on reel post 48 and conventional means are provided for detachably securing the reel bearing 49 in any selected one of a plurality of vertical positions along the reel post 48. A cantilever type reel 50 is journaled in reel bearing 49. Reel 50 is driven in timed relationship to the travel of the harvester along the ground by a belt 51 which is trained over a pulley 52 mounted on the axle 53 of one of the transport wheels 12 (Figure 7). Belt 51 drives a pulley 62 which is suitably journaled on an upstanding post 54 secured to the outside draft frame element 14a and an extensible shaft 55 and universal joints 56 connect the pulley 62 to the reel 50.

The necessary power for driving the cutter bar 8 and the draper conveyor 22 is derived from the power-take-off shaft of the tractor through a conventional extensible shaft and universal joint connection indicated at 57 and a gear box 58 which is mounted directly on the header 9 adjacent to the windrow depositing end of the draper conveyor 22. The drive connections from the gear box 58 respectively to the draper conveyor 22 and the reciprocating knife of the cutter bar 24 are entirely conventional and well-known and hence will not be described in further detail.

Each of the transport wheels 12 and 13 is secured to the respective bracket 11 of the main frame 10 by an axle mounting unit 60, best shown in Figure 9. Axle mounting unit 60 comprises a base plate portion 60a having a plurality of symmetrically disposed mounting holes 60b formed therein and a pair of depending lug portions 60c and 60d which are each apertured to receive a stub axle 7 which is welded or otherwise fixedly secured in the lugs 60c and 60d. On the bottom of frame brackets 11, a horizontal plate portion 11a is formed and symmetrically disposed mounting holes (not shown) are provided in such plate portion which are so arranged as to align with the holes 60b in the wheel mounting unit 60 in either of two 90 degree displaced positions.

It will be noted from Figure 1 that the overall transverse dimension of the harvester is substantially greater than its over-all longitudinal dimension, and this condition is even more aggravated when the harvester is constructed with a cutting bar having an effective cutting width of ten feet or greater. Obviously, the transport of such a wide implement would be very difficult. However, in accordance with this invention, the mounting brackets 60 for the support wheels 12 and 13 permits such wheels to be conveniently shifted to positions illustrated by dotted lines in Figures 1 and 3 so as to support the entire harvester unit for transport with its greater transverse dimension aligned with the direction of movement.

Thus, the transport wheel 12 may be shifted to a 90 degree displaced position with respect to the main frame 10 merely by removing the mounting bolts 61 which secure the wheel mounting bracket 60 to the frame bracket 11, shifting the wheel mounting bracket 60 through 90-degrees and resecuring it to the frame bracket 11 with the bolts 61.

As previously mentioned, the front end of the draft frame 14 is provided with a plate 15 which has a plurality of symmetrically disposed holes 15a formed therein which are alignable with the holes 60b in the wheel mounting bracket 60. During field operation of the harvester, a tongue or hitch member 16 is bolted to the plate 15, utilizing the aforementioned holes 15a. For transport purposes, the transport wheel 13 is removed from its normal working position indicated in Figure 1 and its mounting bracket 60 is bolted to the plate 15 so as to dispose the wheel 13 in a position shown by the dotted lines in Figure 1. Concurrently, the tongue or hitch unit 16 is bolted to the horizontal plate portion 11a from which the wheel 13 has been removed (Figure 8). Thus, the tractor may be connected to the tongue unit 16 in its new position indicated by the dotted lines in Figure 1, and the entire implement can then be transported on the wheels 12 and 13 in their new positions indicated by the dotted lines in Figure 1, and the over-all width of the implement in this transport position will not be excessive, permitting convenient travel along the highway or through farm gates.

Accordingly, it is apparent that this invention provides unusually simple, yet rugged and economically manufacturable construction for a windrow type of harvester and provides a unit not only convenient to operate, but also one which is capable of transport along existing roads and through existing farm gates.

It will, of course, be understood that various details of construction may be varied through a wide range without departing from the principles of this invention and it is, therefore, not the purpose to limit the patent granted hereon otherwise than necessitated by the scope of the appended claims.

I claim:

1. A harvester comprising a wheel supported transverse main frame, a transversely extending header frame, a plurality of angularly shaped supports having their one ends pivoted to spaced points along said main frame and their other ends extending around and beneath said header frame and being freely pivotally attached to the underside of said header frame, means for raising and lowering said header frame relative to said main frame, and a leveling linkage for said header frame comprising a first link pivoted to said main frame, a second link pivoted between said header frame and said first link, and a third link pivoted between one of said supports and a medial portion of said second link, whereby said header frame is maintained in the same angular relationship with respect to the ground through its range of vertical movement.

2. A harvester comprising a wheel supported transverse main frame, a transversely extending header frame, a plurality of angularly shaped supports having their one ends pivoted to spaced points along said main frame and their other ends extending around and beneath said header frame and being freely pivotally attached to the underside of said header frame, means for raising and lowering said header frame relative to said main frame, and a leveling linkage associated with each of said supports, each leveling linkage comprising a first link pivoted to said main frame, a second link pivoted between said header frame and said first link, and a third link pivoted between a medial portion of the respective support and a medial portion of said second link, whereby said header frame is maintained in the same angular relationship with respect to the ground through its range of vertical movement.

DONALD L. BEASLEY.

References Cited in the file of this patent

UNITED STATES PATENTS

| Number | Name | Date |
|---|---|---|
| 1,177,104 | Hendricks | Mar. 28, 1916 |
| 1,319,235 | Messersmith | Oct. 21, 1919 |
| 2,352,479 | Huddle | June 27, 1944 |
| 2,452,153 | Ronning et al. | Oct. 26, 1948 |
| 2,509,357 | Krause | May 30, 1950 |
| 2,514,764 | Herigstad | July 11, 1950 |
| 2,530,668 | Tallman | Nov. 21, 1950 |